US Patent Office 3,446,760
Patented May 27, 1969

3,446,760
HIGH IMPACT STYRENE POLYMER CONTAINING ETHYLENE-ALKYL ACRYLATE COPOLYMER
Robert M. Nowak and Giffin D. Jones, Midland, Mich., assignors to The Dow Chemical Company, Midland, Mich., a corporation of Delaware
No Drawing. Filed Mar. 15, 1965, Ser. No. 439,935
Int. Cl. C08f 33/08
U.S. Cl. 260—4           1 Claim

ABSTRACT OF THE DISCLOSURE

A composition of matter comprising a high impact styrene polymer having intimately incorporated therewith from 0.5 to 10 weight percent of a copolymer selected from the group consisting of (1) copolymers of from 61 to 86 weight percent of ethylene and from 39 to 14 weight percent of propylene, (2) copolymers of from 75 to 96 weight percent of ethylene and from 25 to 4 percent of vinyl acetate or vinyl propionate, or (3) copolymers of from 75 to 96 weight percent of ethylene and from 25 to 4 percent of an acrylic acid ester having from 1 to 4 carbon atoms in the alkyl radical, said copolymers (1) (2) and (3) having a tensile modulus of from 600 to 15,000 lbs./sq. in.

---

This invention relates to the manufacture of high impact styrene polymers. It pertains especially to high impact styrene polymers having good mold release properties and/or a high gloss, and relates to a method of making the same.

It is known to make toughened or high impact styrene poylmers by uniformly and intimately incorporating with polystyrene a small amount of natural or a synthetic rubber either by mechanically blending a resinous styrene polymer with the rubber at elevated temperatures or by dissolving the rubber in monomeric styrene and heating the solution at elevated temperatures to polymerize the monomer and form a normally solid thermoplastic resinous product. Methods of making toughened or high impact styrene polymers are described in United States Patents Nos. 1,613,673, 2,616,864, 2,623,863, 2,862,906, 2,886,553, and 2,694,692. The high impact polymers are useful for various purposes and particularly in the making of molded articles or shaped articles made from extruded sheet, e.g. by vacuum forming, such as cups, containers, refrigerator liners, or refrigerator door liners and the like.

Oftentimes moldings of the high impact styrene polymers are difficult to remove from the mold and are of lower gloss than is desired.

It has now been discovered that high impact styrene polymers having high gloss and/or good mold release properties can readily be prepared by uniformly and intimately incorporating throughout the styrene polymer a small but effective proportion within the range of from about 0.5 to 10, preferably from 0.5 to 6, parts by weight per 100 parts by weight of said styrene polymer, of a copolymer selected from the group consisting of (1) a copolymer of from about 61 to 86 percent by weight of ethylene and correspondingly from 39 to 14 percent by weight of propylene, (2) a copolymer of from 75 to 96 percent by weight of ethylene and from 25 to 4 percent by weight of a vinyl ester having the general formula

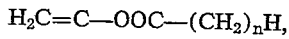

wherein $n$ is a whole number from 1 to 2, and (3) a copolymer of from 75 to 96 percent by weight of ethylene and from 25 to 4 percent by weight of an acrylate having the general formula

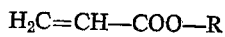

wherein R is an alkyl radical having from 1 to 4 carbon atoms, which copolymers (1), (2) and (3), each have a tensile modulus of from 600 to 15,000 pound per square inch as determined by procedure described in ASTM D1530–58T. It has further been found that the additive copolymers oftentimes provide improvement in one or more physical properties of the product such as impact strength, percent gel, and melt viscosity, such that lesser amounts of the rubber reinforcing agent can be used in preparing high impact styrene polymers.

The high impact styrene polymer can be any normally solid resinous thermoplastic polymer containing in chemically combined form at least 63.75 percent by weight of a monovinyl aromatic compound, not more than 21.25 percent by weight of a vinylidene compound selected from the group consisting of acrylonitrile, methyl methacrylate and alpha-methyl styrene, and from 1 to 15 percent by weight of natural or a synthetic rubber which is a rubbery homopolymer of butadiene or a copolymer of a major proportion by weight, e.g. 50 percent by weight or more, of butadiene and a minor proportion of a monovinyl aromatic hydrcarbn such as styrene. Such styrene polymers and a method of making the same are described in United States Patent No. 3,694,602.

The ethylene-propylene copolymers to be incorporated with the high impact styrene polymer are normally solid predominantly amorphous copolymers such as are described in British Patent No. 857,183, French Patent No. 1,242,404 and Belgium Patents Nos. 462,305 and 462,306.

The ethylene-vinyl ester, i.e. vinyl acetate or vinyl propionate, copolymers to be employed according to the invention, and the ethylene-acrylic acid ester copolymer are the normally solid thermoplastic copolymers, known to the art. They can be prepared as described in United States Patent No. 2,200,429 or 2,953,551.

It is important that the copolymers employed as additives have a tensile modulus as determined by procedure described in ASTM D1530–58T of from 600 to 15,000 and that the copolymer be uniformly and intimately incorporated throughout the styrene polymer, in order that the product have improved gloss and/or mold release properties.

The copolymer additive can be employed in amounts of from about 0.5 to 10, preferably from 1 to 6, parts by weight for 100 parts by weight of the high impact styrene polymer.

It may be mentioned that somewhat greater proportions of the ethylene-acrylic acid ester copolymer are required, than are necessary when using the ethylene-propylene copolymer or the ethylene-vinyl ester copolymer, particularly in the preferred range, to accomplish a similar result.

The gloss and/or mold release improving copolymer can be intimately and uniformly incorporated with the high impact styrene polymer in any usual way such as by heat-plastifying the polymeric ingredients and mechanically blending them with one another in a Banbury mixer, on compounding rolls, or in a plastics extruder. In a preferred practice the copolymer is dissolved in the monomer or in a mixture of the monomer and polymer, e.g. a partially polymerized solution of the styrene monomer and rubber, in admixture with, or without, an inert diluent such as ethylbenzene, toluene, xylene, or ethyl toluene, and the monomer polymerized to produce a high impact styrene polymer containing the additive copolymer, or the gloss and mold release copolymer, uniformly and intimately incorporated throughout.

The compositions of the invention are useful for making cups, containers, refrigerator door liners, and other molded, extruded, and shaped articles such as films or sheet.

The following examples illustrate ways in which the principle of the invention has been applied but are not to be construed as limiting its scope.

Example 1

A feedstock was prepared by blending together 83.3 parts by weight of granular molding grade polystyrene having a melt viscosity of 2800 centipoises, 16.7 parts by weight of a granular copolymer of 88 percent by weight of styrene and 12 percent by weight of polybutadiene having a Mooney number of 55, which copolymer was prepared by dissolving the "Diene," i.e. the polybutadiene, in the monomeric styrene and heating the solution in bulk to polymerize the monomer and form a resinous thermoplastic product, and 1 part by weight of a granular copolymer of 86 percent ethylene and 14 percent vinyl acetate having a tensile modulus of 5900, a melt index of 2 and containing 150 parts by weight of 2,6-di-tert.-butyl-4-methylphenol per million parts by weight of the ethylene-vinyl acetate copolymer, as antioxidant. The feedstock was fed at a rate of 7 pounds per hour to a 1.25 inch diameter screw type plastics extruder wherein it was pressed, heated at temperatures between 220 and 230° C., mechanically worked and extruded as a plurality of fine strands which were cooled and cut to a granular form. The time for which an infinitesimal portion of the material was held in the extruder was about three minutes. The product was fed to the extruder and was heat-plasticized and blended therein for a second time, then was extruded, was cooled and was cut to a granular form. Portions of the final product were injection molded to form test bars of ⅛x½ inch cross-section. These test pieces were used to determine tensile strength and percent elongation values for the product employing procedures similar to those described in ASTM D638–59T. Impact strength was determined by procedure similar to that described in ASTM D256–59T. Other molded portions of the polymer were used to determine the Vicat softening point, the texture and a mold release property. The procedure for determining the mold release property was to injection mold a screw-type bottle cap of about one inch external diameter and of a coarse thread suitable for tightening on a screw-top glass bottle. Said molded bottle cap, to be removed from the male portion of the mold has to be twisted from the threads thereon. After injection molding the bottle cap, the mold is opened, and while the mold and cap are still hot, the cap is clamped in a holder attached to a torque measuring device and the inch-pounds of force required to twist the molded cap and initially free it from the threads was measured. The force to initially free the molded bottle cap from the threads is a measure of the mold releasability of the plastic. "Texture" is a measure of the smoothness of the surface of a molded test piece of the polymeric material as determined by a Surf Tester, i.e. the depth of indentations in micro-inches in the surface of the molding.

For purpose of comparison, a compostion of the polystyrene and the polybutadiene-styrene copolymer, without the ethylene-vinyl acetate copolymer, was prepared and was tested in similar manner. The properties determined for the compositions were as follows:

|  | A | B |
| --- | --- | --- |
| Ethylene-vinyl acetate copolymer (percent) | 0.0 | 1 |
| Tensile strength (lbs./sq. in.) | 4,760 | 4,745 |
| Elongation (percent) | 2.5 | 1.5 |
| Impact strength (ft.-lbs.) | 0.68 | 0.68 |
| Vicat softening point (° F.) | 218 | 218 |
| Melt viscosity (poises) | 3,448 | 3,945 |
| Texture | 18 | 25 |
| Mold release value (in.-lbs.) | 75 | 52 |

Example 2

A charge of 83.3 parts by weight of granular polystyrene, 16.7 parts of a granular copolymer of 88 percent by weight styrene and 12 percent polybutadiene, and 2 parts by weight of a granular copolymer of 86 percent ethylene and 14 percent vinyl acetate, each as described in Example 1, was dry blended and fed to the plastics extruder wherein it was heat plastified and blended in Example 1. The product had the properties:

| | |
| --- | --- |
| Tensile strength lbs. sq. in. | 4686 |
| Elongation percent | 3.5 |
| Impact strength ft. lbs. | 0.58 |
| Vicat softening point ° F. | 217 |
| Melt viscosity poises | 3222 |
| Texture | 26 |
| Mold release value in. lbs. | 30 |

Example 3

A solution consisting of 10 grams of stereo-specific polybutadiene rubber having a Mooney number of 55 ML1+(212° F.) which rubber was free of gels, i.e. it was an amorphous polymer, consisting of over 90 percent 1,4-addition product and about 7.5 percent 1,2-addition product or vinyl structure, with the 1,4-addition product consisting of about 35 percent cis-1,4-configuration and correspondingly about 65 percent trans-1,4-configuration, was prepared by dissolving the polybutadiene in 960 grams of monomeric styrene at room temperature by agitating the mixture for a period of about 16 hours. The solution, together with 2 grams of unsaturated dimer of alpha-methyl styrene, 2 grams of 2,6-di-tert.-butyl-4-methyl phenol and 10 grams of white mineral oil was placed in a 1.5 liter round bottom glass-reaction vessel having an internal diameter of 5.5 inches and equipped with a stirrer and reflux condenser. The stirrer consisted of a 5/16-inch diameter stainless steel shaft having two 5/16-inch diameter cross-arms 3-inches long spaced 1½ apart along the shaft, the lowermost cross-arm being at the bottom end of the shaft. The stirrer was driven by an electric motor with a variable speed control so that the agitation could be controlled by regulating the rate or speed of rotation of the agitator. The reaction vessel was heated by immersing the lower two-thirds of the vessel in a body of a liquid heat-transfer medium, e.g. triethylene glycol, maintained at a desired polymerization temperature. After placing the solution of the polybutadiene rubber and monomeric styrene in the glass reaction vessel heated by means of the liquid heat-transfer bath, the mixture was agitated by rotating the stirrer at a rate of 150 revolutions per minute while heating the mixture at temperatures of 114–116° C. There was added to the solution 30 grams of a granular copolymer of 86 percent ethylene and 14 percent vinyl acetate having a melt index of 2, and a tensile modulus of 5900 while stirring and heating the mixture for a period of one hour, to dissolve said copolymer. The particle size of the rubber in the mixture was 5 microns. Thereafter the agitator was rotated at 30 r.p.m. while heating the mixture at 116° C. for a period of 4.5 hours. Agitation was stopped. The solution contained 29.7 percent by weight of solids. The partially polymerized mixture was removed from the polymerization vessel and portions of the mixture were placed in 1¼-inch internal diameter by 6 inches long screw cap glass bottles. Polymerization of the mixture was continued without agitation by heating the mixture in the sealed glass bottles under time and temperature conditions as follows: 2 hours at 125° C.; 1½ hours at 135° C.; 1½ hours at 150° C.; and 1½ hours at 160° C. Thereafter, the polymeric product was subjected to a heat treatment at a temperature of 285° C. for a period of 30 minutes, then was allowed to cool to room temperature. The product was crushed or cut to a granular form and was devolatilized by heating the same in a vacuum oven at a temperature of 150° C. for a period of 2 hours under an absolute pressure of from 1 to 3 millimeters of mercury. The devolatilized product was cooled and ground to a granular form. Portions of the devolatilized product were compression molded at temperatures between 150° and 160° C. under about 10,000 pounds per square inch gauge pressure to form test bars of ⅛ x ½ inch cross section. These test bars were used to determine the tensile strength, and percent elongation values for the polymer employing procedures similar to those described in ASTM, D638–49T. Impact strength was determined by procedure similar to that described in ASTM D256–47T. Other molded test bars were used to determine the Vicat softening temperature. Other portions of the devolatilized product were used to determine the percent of gel in the polymer and the swelling index. The procedure employed to determine the percent of gel was to place one gram of the polymer in 20 ml. of toluene, agitate the mixture for 2 hours at 60° C., then centrifuge the mixture for 1 hour at 60° C., decant the supernatent liquid and weigh the wet precipitate. The wet precipitate was dried by heating the same in a vacuum oven at a temperature of 215° C. for a period of 30 minutes under 1–3 millimeters of mercury absolute pressure. The percent gel was calculated as the weight of the dry precipitate divided by the weight of the polymeric product initially used. The swelling index was calculated as the ratio of the weight of the wet precipitate divided by the weight of the dry precipitate. The polymeric product had the properties:

Tensile strength _____ lbs./sq. in.__ 2920
Elongation _____ percent__ 20.5
Impact strength_____ ft.-lbs.__ 0.6
Vicat softening point _____ ° F.__ 197
Melt viscosity _____ poises__ 1386
Gel _____ percent__ 5.5
Swelling index _____ 12
Texture _____ 34

Example 4

In each of a series of experiments, a composition consisting principally of styrene interpolymerized with polybutadiene rubber and a copolymer of ethylene and vinyl acetate as described in Example 3, was prepared by procedure similar to that employed in said example, employing the ingredients in amounts as stated in the following table. Table 1 identifies the experiments and gives the proportions of polybutadiene "Diene," and the ethylene-vinyl acetate copolymer, used in preparing the same. The table also gives the properties determined for the composition.

ployed in Example 3, and 950 grams of monomeric styrene, together with 2 grams of unsaturated dimer of alpha-methyl styrene, 2 grams of 2,6-di-tert.-butyl-4-methyl phenol and 10 grams of white mineral oil, and a copolymer of ethylene and propylene of a kind having a tensile modulus and in an amount as stated in Table II below, was polymerized by procedure similar to that employed in Example 3. Table II identifies the experiments and the materials used in preparing the polymeric composition. The table also gives the properties determined for the composition or product.

Example 6

A polymeric composition was prepared by polymerizing a solution of 95 weight percent styrene and 5 percent homopolymer of butadiene similar to that employed in Example 3, together with one part by weight of an ethylene-propylene copolymer having a tensile modulus of 7560 and a melt index of 0.1, employing procedure similar to that employed in Example 3. For comparison, a solution of 6 percent homopolymer of butadiene and 94 percent styrene was polymerized under similar conditions. The products had the properties:

| Test | A | B |
|---|---|---|
| Ethylene-propylene copolymer | 0 | 1 |
| Polybutadiene | 6 | 5 |
| Yield tensile strength (lbs./sq. in.) | 2,500 | 2,700 |
| Rupture tensile strength, (lbs./sq. in.) | 2,600 | 2,700 |
| Elongation (percent) | 40 | 45 |
| Impact Strength (ft.-lbs.) | 1.35 | 1.45 |
| Vicat Soft. Point (° F.) | 205 | 404 |
| Melt Viscosity (cps.) | 3,800 | 4,300 |
| Texture | 40 | 22 |
| Gloss (peak)[1] | 46.9 | 76.3 |
| Gloss (slope)[1] | 42.7 | 72.9 |

[1] Gloss was determined by a Hunter Model D-36 "Distinctness of Image Glossimeter."

Example 7

A polymeric composition was prepared by polymerizing a solution of styrene containing 5.7 percent by weight

TABLE I

| | Added polymer | | Product | | | | | | |
|---|---|---|---|---|---|---|---|---|---|
| Run No. | Diene, percent | E-Va copolymer, percent | Tensile strength, lbs./sq. in. | Elongation, percent | Impact strength, ft.-lbs. | Vicat soft point, ° F. | Melt viscosity, poises | Swell index | Texture |
| 1 | 1 | 6 | 2,715 | 19 | 0.63 | 191 | 1,067 | 10.1 | 70 |
| 2 | 3 | 1 | 3,139 | 27.5 | 0.73 | 198 | 2,391 | 12.3 | 55 |
| 3 | 3 | 3 | 2,890 | 21 | 0.81 | 213 | 2,635 | 10.5 | 84 |
| 4 | 3 | 6 | 2,292 | 15.5 | 0.91 | 203 | 2,493 | 9.6 | 100 |
| 5 | 6 | 6 | 1,475 | 18.9 | 1.29 | 203 | 4,957 | 10.3 | 100 |
| 6 | 1 | 1 | 3,227 | 8.5 | 0.63 | 199 | 1,527 | 11.8 | 18 |

Example 5

In each of a series of experiments, a solution of 50 grams of stereospecific polybutadiene similar to that em- of homopolymer of butadiene similar to that employed in Example 3, together with 2 parts by weight of a copolymer of 80 percent ethylene and 20 percent ethyl

TABLE II

| | | | E-P copolymer | | | | | | | |
|---|---|---|---|---|---|---|---|---|---|---|
| Run No. | Styrene, gms. | Diene, gms. | Gms. | Mole, percent C$_2$H$_4$ | Tensile modulus, lbs./sq. in. | Melt index | Tensile strength, lbs./sq. in. | Elongation, percent | Impact strength | Yield Tensile strength, lbs./sq. in. |
| 1 | 950 | 50 | 10 | 76 | 1,800 | 0.10 | 2,670 | 29 | 1.08 | 2,670 |
| 2 | 950 | 50 | 10 | 85 | 4,250 | 0.42 | 2,890 | 33 | 1.16 | 2,310 |
| 3 | 950 | 50 | 10 | 87 | 6,200 | 0.07 | 2,720 | 30 | 1.30 | 2,790 |
| 4 | 950 | 50 | 10 | 88 | 6,300 | 0.19 | 2,424 | 25 | 1.30 | 2,570 |
| 5 | 950 | 50 | 10 | 93 | 10,700 | 0.34 | 2,660 | 25 | 1.10 | 2,920 |
| 6 | 970 | 30 | 30 | 76 | 1,800 | 0.10 | 2,560 | 30 | 1.22 | 2,700 |
| 7 | 970 | 30 | 30 | 87 | 6,200 | 0.07 | 2,920 | 28 | 1.09 | 2,950 |
| 8 | 970 | 30 | 30 | 91 | 8,500 | 0.24 | 2,720 | 28 | 1.04 | 3,070 |
| 9 | 940 | 60 | None | | | 0.30 | 2,530 | 34 | 1.10 | 2,190 |
| 10 | 980 | 10 | 10 | 71 | 800 | 0.81 | 3,290 | 9 | 0.67 | 3,880 |
| 11 | 960 | 10 | 30 | 71 | 800 | 0.81 | 3,140 | 9 | 0.82 | 3,930 |
| 12 | 960 | 30 | 30 | 71 | 800 | 0.81 | 2,920 | 23 | 0.76 | 3,180 |
| 13 | 940 | 30 | 30 | 71 | 800 | 0.81 | 2,790 | 25 | 0.81 | 2,110 |
| 14 | 920 | 30 | 50 | 71 | 800 | 0.81 | 2,450 | 33 | 1.40 | 2,560 |
| 15 | 930 | 60 | 10 | 71 | 800 | 0.81 | 2,220 | 27 | 1.12 | 2,150 |
| 16 | 880 | 60 | 60 | 71 | 800 | 0.81 | 2,130 | 34 | 1.51 | 1,990 | acrylate having a tensile modulus of 5500 and a melt index of 2, employing procedure similar to that employed in Example 3. For comparison, a composition was prepared in similar manner without the ethylene-ethyl acrylate copolymer. The products had the properties:

| Test | A | B |
|---|---|---|
| Ethylene-ethyl acrylate copolymer | 0 | 2 |
| Polybutadiene | 5.7 | 5.7 |
| Yield tensile strength (lbs./sq. in.) | 3,500 | 3,800 |
| Rupture tensile strength (lbs./sq. in.) | 3,600 | 3,600 |
| Elongation (percent) | 15 | 20 |
| Impact strength (ft.-lbs.) | 0.98 | 1.2 |
| Vicat soft. point (° F.) | 217 | 219 |
| Melt viscosity | 3,900 | 4,000 |
| Texture | 45 | 20 |
| Gloss (peak) | 19.5 | 33.4 |
| Gloss (slope) | 10.6 | 39.4 |

Example 8

In each of a series of experiments, a mixture of a granular copolymer of about 6 percent by weight of stereospecific polybutadiene "Diene" rubber having a Mooney number ML 1+4 (212° F.) and about 94 percent styrene containing 2 percent by weight of white mineral oil and a gloss and mold release improving copolymer, of a kind and in proportions as stated in the following table was fed to a plastics extruder and intimately incorporated with one another employing procedure similar to that employed in Example 1. Table III identifies the experiments and gives the kind and proportion of gloss and mold release improving copolymer employed in making the styrene polymer composition. The table also gives the torque release value and the distinctness of image gloss values determined for the product.

Example 9

In each of a series of experiments, a solution of a stereospecific polybutadiene rubber similar to that employed in Example 3, and styrene, together with a small amount of a copolymer of a kind and amount as hereinafter stated, was polymerized in mass employing procedures similar to those employed in Example 3. The recipe employed was as follows:

Ingredient: Percent by weight
Polybutadiene _____ 6
White mineral oil _____ 1
2,6-di-tert.-butyl-4-methylphenol _____ 0.2
α-Methylstyrene dimer _____ 0.2
Copolymer [1] _____ 1, 3 or 6
Styrene _____ Balance Total _____ 100.0

[1] The copolymers employed were (1) a copolymer of 80 percent by weight of ethylene and 20 percent of ethyl acrylate having a tensile modulus of 5500 and a melt index of 2, (2) a copolymer of 86 percent by weight ethylene and 14 percent vinyl acetate having a tensile modulus of 5900 and a melt index of 2, and (3) a copolymer of ethylene and proylene having a tensile modulus of 7560 and a melt index of 0.1.

Table IV identifies the experiments and gives the proportions of said copolymers (1), (2) and (3) used in preparing the styrene polymer compositions. The table also gives the properties determined for the product.

TABLE IV

| | Added agent, copolymer | | Product | | | | | | |
|---|---|---|---|---|---|---|---|---|---|
| Run No. | Kind | Percent | Tensile strength, lbs./sq. in. | Elongation, percent | Impact strength, ft.-lbs. | Vicat soft. point, ° F. | Melt viscosity | Gel, percent | Mold release, in.-lbs. |
| 1 | None | 0 | 2,511 | 22.5 | 1.06 | 206 | 5,132 | 30.2 | 23.5 |
| 2 | 80% ethylene, 20% ethyl acrylate | 1 | 2,613 | 33.5 | 1.08 | 204 | 6,050 | 35.4 | 11 |
| 3 | do | 3 | 2,132 | 26.6 | 1.11 | 195 | 5,346 | 36.4 | 12 |
| 4 | do | 6 | 1,869 | 20.5 | 1.14 | 201 | 5,372 | 39.0 | 10 |
| 6 | 86% ethylene, 14% vinylacetate | 1 | 2,300 | 32.5 | 1.19 | 200 | 4,943 | 29.9 | 15 |
| 7 | do | 3 | 1,883 | 22.5 | 1.09 | 203 | 3,748 | 33.7 | 13 |
| 8 | do | 6 | 1,475 | 18.9 | 1.29 | 203 | 4,954 | 36.0 | 10 |
| 9 | 85% ethylene, 15% propylene | 1 | 2,147 | 29.5 | 1.17 | 200 | 5,310 | 32.9 | 20 |
| 10 | do | 3 | 2,044 | 14.6 | 1.03 | 200 | 4,269 | 37.8 | 12 |
| 11 | do | 6 | 1,782 | 8.0 | 1.14 | 206 | 4,174 | 38.9 | 10 |

Example 10

In each of a series of experiments, a high impact styrene polymer was prepared employing procedures similar to those employed in Example 3, the additive copolymers (1), (2) and (3) employed in Example 9, and the recipe:

Ingredients: Parts by weight
Polybutadiene _____ 3
White mineral oil _____ 1
2,6-di-tert.-butyl-4-methylphenol _____ 0.2
α-Methylstyrene dimer _____ 0.2
Copolymer _____ 3
Styrene _____ 92.6

Total _____ 100.0

Table V identifies the experiments and gives the properties determined for the product.

TABLE III

| | Starting materials | | | Product | | |
|---|---|---|---|---|---|---|
| | High impact styrene polymer, percent | Additive copolymer | | Gloss | | Torque release, in.-lbs. |
| Run No. | | Kind | Percent | Peak | Slope | |
| 1 | 100 | None | --- | 7.1 | 35.2 | 34.0 |
| 2 | 99.5 | 86% ethylene, 14% vinylacetate | 0.5 | 0.4 | --- | 16.2 |
| 3 | 98.0 | do | 2.0 | 6.9 | 41.8 | 14.5 |
| 4 | 95.0 | do | 5.0 | 6.2 | 21.7 | 19.5 |
| 5 | 99.5 | 85% ethylene, 15% propylene | 0.5 | 0.2 | --- | 16.7 |
| 6 | 98.0 | do | 2.0 | 1.3 | --- | 19.0 |
| 7 | 95.0 | do | 5.0 | 16.4 | 37.2 | 11.9 |
| 8 | 99.5 | 80% ethylene, 20% ethyl acrylate | 0.5 | 7.5 | 41.4 | 38.0 |
| 9 | 98.0 | do | 2.0 | 2.3 | --- | 19.0 |
| 10 | 95.0 | do | 5.0 | 62.1 | 61.2 | 10.7 |

TABLE V

| Run No. | Additive, copolymer | | Product | | | | | |
| --- | --- | --- | --- | --- | --- | --- | --- | --- |
| | Kind | Percent | Tensile strength, lbs./sq. in. | Elongation, percent | Impact strength, ft.-lbs. | Vicat soft. point, °F. | Melt viscosity | Gel, percent |
| 1 | 80% ethylene, 20% ethyl acrylate | 3 | 2,686 | 23.6 | 0.93 | 198 | 2,689 | 18.8 |
| 2 | 86% ethylene, 14% vinyl acetate | 3 | 2,890 | 21.0 | 0.81 | 213 | 2,635 | 19.8 |
| 3 | 85% ethylene, 15% propylene | 3 | 2,613 | 20.2 | 1.24 | 194 | 2,984 | 17.7 |
| 4 | None | | 3,183 | 21 | 0.71 | 198 | 5,758 | 26.7 |

We claim:

1. A composition of matter comprising a normally solid resinous product consisting essentially of a thermoplastic interpolymer of at least 63.75 percent by weight of a monovinyl aromatic compound, not more than 21.25 percent of a monomeric vinylidene compound selected from the group consisting of acrylonitrile, methyl methacrylate and alpha-methylstyrene, and from 1 to 15 percent by weight of unvulcanized rubber that is soluble in monomeric styrene and is selected from the group consisting of natural rubber and rubbery butadiene polymer containing in chemically combined form at least 50 percent by weight of butadiene and not more than 50 percent by weight of a monovinyl aromatic hydrocarbon, having intimately incorporated throughout from 0.5 to 10 parts by weight per 100 parts by weight of said resinous product, of a copolymer selected from the group consisting of (1) copolymer of from 75 to 96 weight percent of ethylene and from 25 to 4 weight percent of an acrylate having the general formula $H_2C=CH-OOR$ wherein R is an alkyl radical having from 1 to 4 carbon atoms, which copolymer has a tensile modulus of from 600 to 15,000.

References Cited

UNITED STATES PATENTS 3,111,500  11/1963  Bartl et al. _____ 260—878 XR
3,162,696  12/1964  Zimmerman et al. ____ 260—878
3,230,186   1/1966  Kreibich et al. _____ 260—4

GEORGE F. LESMES, *Primary Examiner.*

U.S. Cl. X.R.

260—876, 878